United States Patent Office 3,641,138
Patented Feb. 8, 1972

3,641,138
METHOD FOR PRODUCING UNSATURATED ALDEHYDES AND ACIDS
John A. Ondrey, Springdale, and Harold E. Swift, Gibsonia, Pa., assignors to Gulf Research & Development Company, Pittsburgh, Pa.
No Drawing. Filed May 31, 1968, Ser. No. 733,312
Int. Cl. C07c 47/22, 57/04
U.S. Cl. 260—530 N    11 Claims

ABSTRACT OF THE DISCLOSURE

A method of oxidizing propylene and isobutene to the corresponding unsaturated aldehydes and acids and for oxidizing the unsaturated aldehydes of propylene and isobutene to the corresponding unsaturated acids by the vapor phase reaction with molecular oxygen in the presence of a catalyst of cobalt molybdate promoted with a composition of molybdenum, tellurium and oxygen. Propylene is converted to acrolein and acrylic acid and acrolein in converted to acrylic acid.

The present invention relates to a novel composition of matter of molybdenum, tellurium and oxygen, to a method of making this material and to a process for preparing unsaturated aldehydes and acids utilizing cobalt molybdate as a catalyst promoted with a composition of molybdenum, tellurium and oxygen.

Many processes have been proposed for the production of unsaturated aldehydes and acids, particularly acrolein, methacrolein, acrylic acid and methacrylic acid. One method that hs been proposed involves the vapor phase oxidation of propylene or isobutene in the presence of molecular oxygen over a cobalt molybdate catalyst. This process results in unsatisfactory yields. A suggested improvement of this process involves the incorporation of tellurium dioxide in the cobalt molybdate as a promoter. Although the yields are improved, this process involves the serious disadvantage that tellurium dioxide is very poisonous and is volatile at the reaction conditions, i.e. about 450° C. Therefore, the process requires procedures for recovering the vaporized tellurium dioxide and for the continual replenishment of the catalyst with this promoter.

We have unexpectedly discovered a novel composition of molybdenum, tellurium and oxygen, which significantly promotes the activity of cobalt molybdate for the vapor phase oxidation of propylene and isobutene to produce exceptionally high yields of the desired unsaturated aldehydes and unsaturated acids while minimizing the yields of the less desired saturated acids and undesired carbon dioxide. A further aspect of this invention involves the vapor phase oxidation of acrolein and methacrolein to the corresponding unsaturated acid in good yield using the novel promoted catalyst. Not only are the yields of desired products exceptionally high, but also the novel promoted catalyst of this invention retains excellent activity over prolonged periods of operation without losing the promoter. Of further advantage is the fact that this novel promoted catalyst can be utilized in this process either unsupported or supported on a suitable carrier.

The novel composition of mater is conveniently prepared by the high temperature oxidation of molybdenum ditelluride using molecular oxygen. When prepared in this manner it contains from about 20 to about 27 weight percent molybdenum, from about 50 to about 73 weight percent tellurium, and from about one to about 20 weight percent oxygen. A substantially completely oxidized sample will contain about 24 weight percent molybdenum, about 57 weight percent tellurium and about 19 weight percent oxygen, having an empirical formula of substantially about $MoTe_{1.8}O_{4.9}$. It is known that certain tellurides such as cobalt telluride decompose at elevated temperatures in the presence of molecular oxygen to the individual oxides such as cobalt oxide and tellurium dioxide, therefore, it is highly unexpected that molybdenum ditelluride does not decompose under these conditions to tellurium dioxide and molybdenum trioxide but rather that it forms the novel composition of matter of this invention. This novel composition is characterized by an oxygen content significantly less than that required for a stoichiometric relationship for the three components empirically expressible as molybdenum trioxide and tellurium dioxide.

Molybdenum ditelluride is a dark black crystalline material having a distinct and characteristic X-ray diffraction pattern. Molybdenum ditelluride is conveniently utilized in a powdered form to assist in the oxidation. In carrying out this oxidation, it is slowly heated in molecular oxygen, such as air, to an elevated temperature and preferably held at an elevated temperature for sufficient time to complete the oxidation. In this process the oxidized molybdenum ditelluride is converted to a dark green molten fass which solidifies upon cooling to a glass-like material. When this substantially fully oxidized glass-like material is powdered and subjected to appropriate analytical techniques including X-ray diffraction, X-ray fluorescence and differential thermal analysis, it is determined that no molybdenum oxide, molybdenum ditelluride or tellurium dioxide is present, that it is amorphous to X-rays, that it is a simple composition, and that its empirical composition is substantially about $MoTe_{1.8}O_{4.9}$. This novel composition is prepared by heating molybdenum ditelluride in the presence of air at a temperature between about 250° C. and about 700° C. and preferably within the range of about 30° C. to about 650° C. to oxidize the material. For substantially complete oxidation the time of heating is in part dependent upon the temperature at which oxidation takes place, for example, when powdered molybdenum ditelluride is heated to about 500° C., complete oxidation requires a time of about 15 to 20 hours. The duration of this complete reaction can be predetermined from prior results or it can be conducted until no further gain in weight is evidenced. The reaction involves a small of tellurium as tellurium dioxide, which evolves slowly during the reaction, with a net weight gain as a result of the oxidation. Upon cooling, this molten mass solidifies to a glassy material which is conveniently ground to a fine powder for further use as a promoter in this invention. Although differential thermal analysis of the glassy material indicates an endothermic peak at about 450° C., which is indicative of a softening of the material, there is no identifiable agglomerating or coalescing of particles at significantly higher temperatures when this material is used as a promoter for cobalt molybdate.

Although the substantially completely oxidized molybdenum ditelluride material as described is most preferred for use as a promoter for cobalt molybdate, the partial oxidation product containing as little as about one weight percent oxygen can also be used; however, the more preferred promoter material contains about 22 to about 25 weight percent molybdenum, about 55 to 70 weight percent tellurium and about 5 to about 20 weight percent oxygen. Additional oxidation of the partially oxidized promoter material in use in conjunction with cobalt molybdate in the presence of oxygen for the oxidation of unsaturated hydrocarbons hereunder will convert it to the more fully oxidized state within the ranges specified.

Oxidation of molybdenum ditelluride in admixture with up to about 90 mol percent, preferably up to about 50 mol percent, molybdenum trioxide or tellurium dioxide results in a promoter material containing molybdenum, tellurium and oxygen which may be outside the specified compositional ranges for the oxidation of molybdenum ditelluride alone but which is also characterized by having a lower oxygen content than that stoichiometrically required for an equivalent amount of molybdenum and tellurium as molybdenum trioxide and telluurium dioxide. Also included as a promoter material herein is the glass-like material formed by heating about 10 to about 90 mol percent, preferably about 15 to about 50 mol percent, molybdenum trioxide with tellurium dioxide.

The catalyst used in this invention is promoted cobalt molybdate. Cobalt molybdate as used in the claims herein is defined as a compound of molybdenum, cobalt and oxygen having the formula $CoMoO_4$, or it is a mixture of this compound and one or more of the oxides of molybdenum and cobalt, or it can be a mixture of the oxides of molybdenum and cobalt. The exact composition of the cobalt molybdate is controlled to a substantial extent by the procedure used for its preparation. The cobalt molybdate is conveniently and preferably prepared by precipitating the cobalt molybdate from a solution of a cobalt compound and a molybdenum compound. The nature of the cobalt molybdate prepared by such a procedure is determined in part by the conditions utilized and the proportion of the cobalt and molybdenum compounds used. It is preferred that the proportion of cobalt compound to molybdenum compound be adjusted so that the ratio of cobalt to molybdenum in the catalyst is substantially about one to one, although the ratio can vary within moderately wide limits.

The promoted cobalt molybdate catalyst of this invention can conveniently be produced by thoroughly mixing powdered cobalt molybdate as above described and the powdered glass-like composition containing molybdenum, tellurium and oxygen and calcining the mixture in air at elevated temperature. For catalytic purposes the promoted catalyst desirably contains from about .1 to about 20 weight percent of the promoter and preferably for about .5 to about 10 weight percent of the promoter. Alternatively the promoted catalyst can be prepared with substantial equal efficiency by grinding cobalt molybdate with molybdenum ditelluride in water to form a thick homogeneous paste, drying the mixture and then calcining it in air at the conditions required for the desired promoter composition. In the conversion of molybdenum ditelluride to the $MoTe_{1.8}O_{4.9}$ promoter material, about 15 percent weight gain is effected. Therefore, the appropriate amount of molybdenum ditelluride for use in this alternative procedure is readily ascertainable. In the production of these promoted catalysts by these procedures utilizing molybdenum ditelluride to form the promoter, the product exhibits an X-ray diffraction pattern identical for that cobalt molybdate initially used establishing that the cobalt molybdate is not changed by the procedure and that no molybdenum telluride or tellurium dioxide is present in the final product.

In the process hereunder for oxidizing the olefin to the corresponding aldehyde and acid, a mixture of the olefin, of molecular oxygen, and an inert diluent in the vapor phase are passed over the promoted catalyst at an elevated temperature. Suitable inert diluents such as nitrogen, water vapor, the noble gases, etc. are added to vary the proportion of reactants in the feed stream to control the reaction stoichiometry and to avoid the explosive limits of the feed gas mixture. Since air is a very convenient source of molecular oxygen, the inert diluent can suitably be nitrogen from the air with water vapor added to provide a suiutable concentration of the reactants. The hydrocarbon can suitably be from about one volume percent to about 50 volume percent of the feed gas mixture and preferably about five volume percent to about 30 volume percent. The oxygen concentration in the feed gas mixture can be from about three volume percent to about 50 volume percent of the feed gas mixture and preferably from about five volume percent to about 30 volume percent. The ratio of hydrocarbon to oxygen in the feed gas mixture can vary from between about 2.0 to about 0.25 and preferably from about 1.0 to about 0.5.

The highest selectivity to useful products, e.g. acrylic acid, acrolein and less desirably acetic acid in the case of propylene oxidation hereunder, occurs when the promoter is about .5 to 5 percent of the unsupported catalyst composition and therefore this range is the most preferred for this process. Within this range the total conversion also reaches a maximum, and additionally the selectivity to acrylic acid also is the greatest. As the amount of promoter is inceased, the proportion of acrolein increases as well as the proportion of highly undesired carbon dioxide. Since carbon dioxide is the primary undesired byproduct, it is desirable to carry out the reaction under conditions which maximize total conversion and selectivity to the desired product distribution and minimize carbon dioxide production. Acetic acid is the least desired of the usable products and in all desirable ranges of operation is a very minor product. These same relations apply in the conversion of isobutene to methacrolein and methacrylic acid.

The coversion, selectivity and product distribution are, in part, a function of the reaction temperature. As the temperature is raised from ambient conditions, the initial reaction although of low conversion is highly selective to the desirable oxygenated products. As the temperature is further increased, the selectivity gradually decreases up to about 500° C. at which the decrease occurs at a more rapid rate. The conversion on the other hand increases and peaks at about 450° C. and then decreases as the carbon dioxide production becomes of greater significance. As a result, the preferred temperature of operation is from about 370° C. to about 550° C. and the most preferred range of temperature for carrying out the process is between about 400° C. and about 475° C. As the temperature is increased in this range, the amount of acrolein constantly decreases while that for acrylic acid increases and reaches a maximum at about 475° C. Therefore, the temperature is of significance in establishing not only the conversion and selectivity but also in determining the product distribution.

The contact time of the feed gas mixture with the unsupported catalyst is also of significance with respect to the total conversion, selectivity and product distribution. As the contact time is decreased, the selectivity to desirable products increases while the total conversion decreases. Also in decreasing the contact time the proportion of aldehyde increases while the proportion of the unsaturated acid and of carbon dioxide decreases. We can suitably conduct our process for the conversion of the olefin to the unsaturated aldehyde and unsaturated acid when a gas hourly space velocity with respect to the olefin of from about 30 to about 480 is utilized and preferably from about 60 to about 180.

The promoted catalyst can be supported on a suitable inert support such as alumina, silica, and zirconia, etc. In the supported catalyst the same ratio for the cobalt molybdate to the promoter as used in the unsupported catalyst is satisfactory. Unexpectedly, we have discovered that the supported catalyst has a very high selectivity, up to 95 percent or greater with the main product constituting the unsaturated aldehyde and with no identifiable formation of the saturated acid. Therefore, the use of a supported catalyst is particularly suitable in this process for producing the unsaturated aldehyde. When the unsaturated acid is the preferred product, the unsupported catalyst is preferred. A correlation of the catalyst composition, temperature, space velocity and feed gas composition is undertaken to maximize the production of hte unsaturated acid, that is acrylic acid or methacrylic acid. When this unsaturated acid is the desired product, the unsaturated aldehyde can be separated from the product mixture and can separately be converted to the corresponding unsaturated acid over the promoted catalyst of this invention or it can conveniently be recycled to the olefin-containing feed gas mixture for conversion to the unsaturated acid.

When the promoted catalyst of this invention is used over extended periods of time, the selectivity and product distribution remains substantially constant. However, the conversion decreases from its initial amount to a lower value. The amount of decrease in conversion over long periods of operation is believed to be a result of polymerization of the unsaturated aldehyde and acid on the catalyst surface. This decline in actviity will decrease if the contact time is decreased and if the olefin to oxygen ratio is decreased such that a minor loss of conversion over long periods of operating time is experienced. The used catalyst can be readily restored to its initial activity by heating in air at reaction temperature.

The following examples are illustrative of our invention and are not intended as a limitation thereof.

EXAMPLE 1

A two gram sample of molybdenum ditelluride powder, $MoTe_2$, was slowly heated in a crucible in air to a maximum temperature of 650° C. over a period of about 16 hours and was held at this temperature for an additional six hours. The dark black $MoTe_2$ powder was converted to a dark green mass which was sufficiently fluid at 650° C. to creep slowly when the crucible was tilted. It solidified upon cooling to a glassy material weighing 2.3 grams. The glass was ground to a fine powder and its stoichiometry was determined to be 23.6±2.9 weight percent tellurium, and the remainder oxygen by X-ray fluorescence using a molybdenum ditelluride standard and by differential thermal analysis. If a free oxide of molybdenum or tellurium were present, it would be expected to be molybdenum trioxide or tellurium dioxide; however, the preparation was carried out at a temperature above the sublimation temperature of molybdenum trioxide and tellurium dioxide. Molybdenum ditelluride and the oxides of molybdenum and tellurium form distinct and characteristic X-ray diffraction patterns. X-ray diffraction analysis of the powdered dark green glassy product disclosed that it was amorphous to X-rays and that none of the crystalline oxides of molybdenum or tellurium or molybdenum ditelluride or the free elements was detected. The composition was determined to be a chemical combination of molybdenum, tellurium and oxygen having an empirical composition of substantially about $MoTe_{1.8}O_{4.9}$.

EXAMPLE 2

A solution of 582 grams of cobalt nitrate and 354 grams of ammonium molybdate was prepared using 1,000 cc. of water. The precipitate obtained by slowly adding 320 cc. of 50 percent ammonium hydroxide to the solution was filtered and washed with cold water then oven dried at 110° C. for 16 hours. It was then calcined for 24 hours in air at 550° C. and the surface area of the resulting cobalt molybdate was determined to be 3.77 M.²/g. by krypton adsorption.

EXAMPLE 3

After grinding the glass-like compoistion as produced in Example 1 to a fine powder, 0.25 gram of this powder was further ground with 20 grams of cobalt molybdate as produced in Example 2. The powdered mixture was oven dried overnight at 110° C. and then calcined in air at 550° C. for 24 hours. The resulting mixture was a purple granular material of about 10 to 20 mesh size. The X-ray diffraction patern of this product was identical to the pattern of the starting cobalt molybdate.

EXAMPLE 4

A thick homogeneous paste was formed by grinding in water 20 grams of cobalt molybdate as prepared in Example 2 and 0.25 gram of molybdenum ditelluride. This paste was oven dried at 110° C. for 16 hours and calcined in air at 550° C. for 24 hours. The X-ray diffraction pattern of this product was identical to the pattern of the initial cobalt molybdate. The resulting product was determined to be a mixture of cobalt molybdate and $MoTe_{1.8}O_{0.9}$ having a surface area of 3.68 M.²/g. as determined by krypton adsorption.

EXAMPLE 5

A supported catalyst was made by grinding in water 20 grams of cobalt molybdate as prepared in Example 2 with 0.5 gram of molybdenum ditelluride until a thick homogeneous paste was formed. Approximately one-third of this paste was incorporated into 150 grams of a commercially aavilable form of an alpha alumina having a surface area of 0.2 m.²/g. by slurrying the two together. The slurry was oven dried overnight at 110° C. and then calcined in air at 600° C. for 24 hours. The resulting granular powder consisted of about 4.2 weight percent cobalt molybdate, about 0.11 weight percent $MoTe_{1.8}O_{4.9}$ and the remainder alpha alumina.

EXAMPLE 6

A supported catalyst was produced in the same manner as described in Example 5 except that 0.5 gram of the glass-like material having an empirical formula of about $MoTe_{1.8}O_{4.9}$ as produced in Example 1 was powdered and used in place of molybdenum ditelluride. The resulting granular powder had a surface area of 0.74 m.²/g. It consisted of cobalt molybdate, $MoTe_{1.8}O_{4.9}$, and alpha alumina.

EXAMPLE 7

A series of runs were conducted to determine the catalytic activity of a number of solid materials in the reaction of propylene with oxygen to produce acrolein and acrylic acid. Several of hte products of the preceding examples were used as indicated in Table I. The reactor was constructed of 22 mm. O.D. quartz tubing, 42 cm. in length, with a 5 mm. thermowell extending the length of the catalyst zone. The solid material undergoing test was mixed with an equal volume (10 cc.) of silicon carbide. Silicon carbide was placed above the catalyst bed to serve as a gas mixer and a preheat section. The reactor was heated by a tube furnace equipped with a temperature controller. Propylene and air were metered into the heating section where they were mixed with steam before contacting the catalyst. The feed streams consisted of 11 volume percent propylene, 55 volume percent air and 34 volume percent steam.

At the start of each run, air was slowly passed through the reactor while the catalyst was brought to the reaction temperature of 435° C. After one hour of pretreatment with air, the reactor was flushed with nitrogen for 15 minutes and then the propylene, air and steam were metered into the reactor at the specified rates at a total pressure of one atmosphere and a flow rate to provide a contact time with the catalyst of 3.3 seconds based on the total gas flow. The percent conversion and product distribution for two-hour runs are listed in Table I in which the products are specified in mol percent.

TABLE I

| Catalyst | Conversion | Acrylic acid | Acrolein | Acetic acid | $CO_2$ |
|---|---|---|---|---|---|
| $MoTe_2$ | Inactive | | | | |
| Example 1 | Inactive | | | | |
| Example 2 | 23 | 28.0 | 30.9 | 11.0 | 30.0 |
| Example 2+2 wt. percent $TeO_2$ | 45 | 50.3 | 28.5 | 4.2 | 17.0 |
| Example 3 | 53 | 57.4 | 23.8 | 4.8 | 14.0 |
| Example 4 | 58 | 58.6 | 28.8 | 1.6 | 11.0 |

These results show that initial activity of a mixture of cobalt molybdate and the promoter of this invention is significantly superior for the production of upgraded products particularly acrylic acid than the initial activity of cobalt molybdate-tellurium dioxide mixture before it has lost a significant amount of its tellurium dioxide.

EXAMPLE 8

Additional experiments were carried out to determine the effect of a variation of the amount of the promoter in the catalyst prepared in accordance with the procedures of Example 4. The procedures and conditions of Example 7 were duplicated except that a temperature of 425° C. was used in each run. The percent conversion and selectivity to acrylic acid and acrolein are listed in Table II in which the products listed are in mol percent.

TABLE II

| Promoter | Conversion | Selectivity | Acrylic acid | Acrolein | Acetic acid | $CO_2$ |
|---|---|---|---|---|---|---|
| 0 | 23 | 70 | 28 | 31 | 11 | 30 |
| .57 | 48 | 86.5 | 53 | 29.5 | 4 | 14 |
| 1.15 | 55 | 89 | 57.5 | 29.5 | 2 | 11 |
| 2.8 | 59 | 90 | 60 | 29 | 1 | 10 |
| 4.6 | 59 | 90 | 58.5 | 30.5 | 1 | 10 |
| 5.7 | 58 | 89.5 | 55 | 33.5 | 1 | 10.5 |
| 8.5 | 55 | 88.5 | 46.5 | 41 | 1 | 11.5 |
| 11.3 | 51 | 88 | 38 | 48 | 1 | 13 |
| 22.3 | 35 | 80.5 | 20 | 60 | .5 | 19 |

The highest conversion and selectivity to acrylic acid and acrolein occurs in this example at a concentration of the promoter in the range of about .5 to about 10 weight percent with the optimum occurring in the range of about 1 to about 8 weight percent.

EXAMPLE 9

The effect of temperature on the oxidation of propylene in the presence of cobalt molybdate containing 1.15 percent of the promoter as prepared in Example 4 was studied in a series of runs utilizing the same conditions, procedures and feed gas mixture as outlined in Example 7 including a contact time of 3.3 seconds based on total gas flow. The resulting percent conversion and products in mol percent are set forth in Table III.

TABLE III

| Promoter | Conversion | Selectivity | Acrylic acid | Acrolein | Acetic acid | $CO_2$ |
|---|---|---|---|---|---|---|
| 360 | 20 | 95 | 20 | 75 | 1.5 | 4 |
| 365 | 25 | 95 | 27 | 67 | 1.5 | 4 |
| 375 | 32 | 94 | 30.5 | 62.5 | 1.5 | 5 |
| 390 | 41 | 94 | 39 | 53 | 1.7 | 6 |
| 425 | 56 | 91 | 52 | 37.5 | 1.5 | 9 |
| 450 | 58 | 90 | 55 | 33 | 2.0 | 10 |
| 500 | 46 | 83 | 56 | 25 | 2.0 | 17 |
| 530 | 30 | 65 | 52 | 17 | 2.0 | 29 |
| 535 | 27 | 60 | 49.5 | 14 | 2.0 | 34.5 |

Total conversion reached a maximum at about 450° C. Selectivity decreased as the temperature was raised decreasing rapidly above about 500° C., while the production of carbon dioxide increased gradually with temperature and increased rapidly above about 500° C.

EXAMPLE 10

The effect of space velocity on this reaction was studied at 425° C. using the same equipment, feed gas composition and procedures as used in Example 7. A cobalt molybdate catalyst containing 1.15 weight percent of the promoter as prepared in Example 4 was used in all runs. The results are set forth in Table IV, which gives the gas hourly space velocity of propylene, the total percent conversion and selectivity to acrylic acid, acrolein and acetic acid and the products in mol percent.

TABLE IV

| Promoter | Conversion | Selectivity | Acrylic acid | Acrolein | Acetic acid | $CO_2$ |
|---|---|---|---|---|---|---|
| 60 | 59.5 | 86.5 | 50 | 33 | 3 | 13.5 |
| 120 | 59 | 91.5 | 51 | 38.5 | 1.5 | 8.5 |
| 240 | 55 | 94 | 45 | 48 | .1 | 6 |
| 480 | 18 | 94.5 | 32 | 62 | .5 | 5.5 |

A gas hourly space velocity of 120 based on propylene is equivalent to a contact time of 3.3 seconds based on the total gas containing 11 volume percent propylene, 55 volume percent air and the remainder steam.

EXAMPLE 11

The effect of a variation in the partial pressures of propylene and oxygen in the feed stream was studied using 10 cc. of cobalt molybdate containing 1.15 weight percent of the promoter as prepared in Example 4 mixed with silicon carbide and utilizing the equipment and procedure as described in Example 7. All runs were carried out at a temperature of 425° C. and a total gas contact time of 3.3 seconds, that is a gas hourly space velocity of 1092, for the feed mixture of propylene, air and steam. The results are set out in Table V in which the product values are in mol percent.

TABLE V

| Propylene partial pressure, atm. | Oxygen partial pressure, atm. | $C_3^-/O_2$, mole ratio | Percent total conversion | Acrylic acid | Acrolein | Acetic acid | $CO_2$ |
|---|---|---|---|---|---|---|---|
| 0.055 | 0.11 | 0.5 | 65.3 | 59.4 | 31.8 | | 9.2 |
| 0.11 | 0.165 | 0.66 | 61.4 | 60.1 | 27.1 | 1.2 | 11.7 |
| 0.11 | 0.11 | 1 | 60.9 | 55.8 | 33.2 | 0.7 | 8.7 |
| 0.11 | 0.11 | 1 | 58.2 | 57.2 | 32.1 | 2.1 | 7.9 |
| 0.165 | 0.11 | 1.5 | 41.8 | 51.6 | 38.3 | 1.2 | 8.9 |
| 0.11 | 0.055 | 2 | 43.1 | 56.8 | 32.0 | 1.4 | 9.8 |

EXAMPLE 12

A number of 24 hour runs were conducted at 425° C. otherwise using the same procedures, equipment, feed stream, contact time and conditions as used in Example 7 over a cobalt molybdate catalyst containing 1.15 weight percent of the promoter as prepared in Example 4. Over this period the selectivity to acrylic acid, acrolein and acetic acid remained at a constant 88 percent with the product distribution remaining constant over this period. The initial conversion was 57 percent and gradually declined to a constant value of about 45 percent in about 16 hours. Equivalent results were obtained using a cobalt molybdate catalyst containing one weight percent of the promoter as prepared by the procedures of Example 3. Increasing the propylene partial pressure increased the loss in activity of the catalyst; however, the initial activity was restored by heating the catalyst in air, e.g. at 500° C. for two hours.

EXAMPLE 13

The supported catalyst made as described in Example 5 was used in the reaction of propylene using the procedures, equipment and feed stream as described in Example 7 and 20 cc. of the catalyst unmixed with silicon carbide. Specific conditions and results are set forth in Table VI in which the gas hourly space velocity is based on propylene. Selectivity to acrylic acid and acrolein was about 95 percent with no acetic acid produced by the reaction.

TABLE VI

| GHSV | Temp., °C. | Conversion, percent | Acrolein to acrylic acid mol ratio |
|---|---|---|---|
| 120 | 425 | 16.8 | 7.5 |
| 60 | 425 | 30.6 | 3.3 |
| 30 | 425 | 44.6 | 2.2 |
| 30 | 475 | 47.7 | 0.54 |

This example further demonstrates that the mol ratio of acrylic acid to acrolein is increased by an increase in the contact time of the feed stream with the promoted catalyst and by an increase in temperature. Although the mol ratio of acrylic acid to acrolein is increased with an increase in the temperature of this reaction, it is also accompanied with a significant increase in the aging of the catalyst.

EXAMPLE 14

The conversion of acrolein to acrylic acid was carried out utilizing the same equipment and procedures specified in Example 7. Ten cc. of a cobalt molybdate catalyst prepared in accordance with the procedures of Example 4 and containing 1.15 weight percent of the promoter were mixed with 10 cc. of silicon carbide as a diluent. The feed mixture was acrolein, oxygen, nitrogen and steam with a liquid hourly space velocity based on acrolein of 0.3 used in each run. The three mixtures used contained 10.8 and 10.8, 10.8 and 21.6, and 10.8 and 32.4 volume percent of acrolein (as a gas) and oxygen respectively with the remainder being a mixture of nitrogen and steam. The total percent conversion and the mol percent of components in the product stream are set forth in Table VII.

TABLE VII

| T., °C. | Acrolein, $O_2$ | Conversion | Acrolein | Acrylic acid | Acetic acid | $CO_2$ |
|---|---|---|---|---|---|---|
| 350 | 1:1 | 8 | 91 | 5 | | 3.5 |
| 350 | 1:2 | 12.5 | 87.4 | 7.9 | | 4.7 |
| 350 | 1:3 | 13.5 | 87 | 18.8 | | 4.2 |
| 400 | 1:1 | 46 | 51.5 | 38.5 | .5 | 9 |
| 400 | 1:2 | 50.5 | 49.4 | 42.3 | | 8.3 |
| 400 | 1:3 | 53.5 | 38.6 | 51.4 | 0.7 | 9.3 |
| 425 | 1:1 | 80 | 20 | 68 | 1 | 11.5 |
| 425 | 1:2 | 85 | 14.9 | 66.2 | 1.4 | 17.5 |
| 425 | 1:3 | 81.5 | 18.7 | 62.8 | 0.6 | 18.0 |

These results indicate within the range tested that the mol ratio of acrolein to oxygen is not controllingly significant in the conversion.

The conversion of isobutene to methacrolein and methacrylic acid is effected using the same catalyst and the same general conditions and ranges as exemplified in detail for the conversion of propylene. Additionally methacrolein is converted to methacrylic acid in a like manner as that exemplified for the conversion of acrolein to acrylic acid. In carrying out this reaction to obtain the most economical results for any particular desired objective, the conditions, procedures and compositions of promoted catalyst and feed gas can readily be correlated using these disclosures as a guide.

It is to be understood that the above disclosure is by way of specific example and that numerous modifications and variations are available to those of ordinary skill in the art without departing from the true spirit and scope of our invention.

We claim:

1. A process which comprises reacting a feed mixture of oxygen, an inert diluent and a material selected from the group consisting of propylene, isobutene, acrolein, methacrolein, and mixtures thereof at a temperature between about 370° C. and about 550° C. in the presence of a catalyst consisting essentially of about 80 to 99.9 weight percent cobalt molybdate and about 0.1 to about 20 weight percent of a catalytic promoter prepared by heating molybdenum ditelluride in the presence of molecular oxygen at a temperature between about 250° C. and about 700° C.

2. A process in accordance with claim 1 in which said catalytic promoter is characterized by an oxygen content less than that stoichiometrically required for an equivalent amount of molybdenum and tellurium as molybdenum trioxide and tellurium dioxide.

3. A process in accordance with claim 2 in which said catalyst promoter consists essentially of from about 20 to about 27 weight percent molybdenum, from about 50 to about 73 percent tellurium and from about one to about 20 percent oxygen.

4. A process in accordance with claim 3 in which the empirical formula of said catalyst promoter is about $MoTe_{1.8}O_{4.9}$.

5. A process in accordance with claim 4 in which the material is propylene and a mixture containing acrolein and acrylic acid is produced.

6. A process in accordance with claim 5 in which the temperature is between about 400° C. and about 475° C.

7. A process in accordance with claim 5 in which the acrolein is recycled and added to said feed mixture.

8. A process in accordance with claim 4 in which the material is isobutene and a mixture containing methacrolein and methacrylic acid is produced.

9. A process in accordance with claim 8 in which the temperature is between about 400° C. and about 475° C.

10. A process in accordance with claim 8 in which the methacrolein is recycled and added to the said feed mixture.

11. A process in accordance with claim 4 in which the catalyst consists essentially of about 90 to about 99.5 percent cobalt molybdate and the remainder said catalyst promoter.

References Cited

UNITED STATES PATENTS

| 3,098,102 | 7/1963 | Bethell et al. | 260—533 N |
| 3,405,172 | 10/1968 | Brown et al. | 260—533 N |
| 3,475,488 | 10/1969 | Kurata et al. | 260—533 |

FOREIGN PATENTS

| 878,802 | 10/1961 | United Kingdom | 260—533 N |
| 4,114,982 | 8/1966 | Japan | 260—533 N |

LORRAINE A. WEINBERGER, Primary Examiner

R. D. KELLY, Assistant Examiner

U.S. Cl. X.R.

260—533 N, 604 R; 252—439

PO-1050
(5/69)

UNITED STATES PATENT OFFICE
CERTIFICATE OF CORRECTION

Patent No. 3,641,138                    Dated February 8, 1972

Inventor(s) John A. Ondrey and Harold E. Swift

It is certified that error appears in the above-identified patent and that said Letters Patent are hereby corrected as shown below:

Column 1, line 21, "in" should read --is--. Column 1, line 34, "hs" should read --has--. Column 1, line 64, "mater" should read --matter--. Column 2, line 24, "fass" should read --mass--. Column 2, line 36, "30° C." should read --300° C.--. Column 2, line 45, "a small of" should read --a small loss of--. Column 3, line 7, "telluurium" should read --tellurium--. Column 3, line 39, "for" should read --from--. Column 3, line 68, "suiutable" should read --suitable--. Column 4, line 70, "hte" should read --the--. Column 5, line 29, "23.6±2.9" should read --23.6±1.2 weight percent molybdenum, 57.1±2.9--. Column 5, line 59, "compoistion" should read --composition--. Column 6, line 3, "$O_{0.9}$" should read --$O_{4.9}$--. Column 6, line 13, "aavilable" should read --available--. Column 6, line 34 "hte" should read --the--. Column 7, line 47, "conversion and products" should read --conversion and selectivity to acrylic acid, acrolein and acetic acid, and products--. Column 7, Table III, heading, "Promoter" should read --Temp.°C.--.
Column 8, Table IV, heading, "Promoter" should read --GHSV--.
Column 10, claim 1, line 4, "99.9" should read --about 99.9--.

Signed and sealed this 27th day of June 1972.

(SEAL)
Attest:

EDWARD M. FLETCHER, JR.               ROBERT GOTTSCHALK
Attesting Officer                     Commissioner of Patents